(12) United States Patent
Julien et al.

(10) Patent No.: US 10,920,656 B2
(45) Date of Patent: Feb. 16, 2021

(54) INTERNAL COMBUSTION ENGINE COOLING SYSTEM

(71) Applicant: PRATT & WHITNEY CANADA CORP., Longueuil (CA)

(72) Inventors: Andre Julien, Sainte-Julie (CA); Michael Lanktree, La Prairie (CA); Serge Dussault, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 813 days.

(21) Appl. No.: 15/618,945

(22) Filed: Jun. 9, 2017

(65) Prior Publication Data

US 2018/0355787 A1 Dec. 13, 2018

(51) Int. Cl.
*F02B 29/04* (2006.01)
*F01P 7/16* (2006.01)
*F02B 41/10* (2006.01)
*F02B 53/00* (2006.01)
*F01P 3/18* (2006.01)

(52) U.S. Cl.
CPC .......... *F02B 29/0412* (2013.01); *F01P 7/165* (2013.01); *F02B 29/0418* (2013.01); *F02B 29/0431* (2013.01); *F02B 29/0443* (2013.01); *F02B 29/0493* (2013.01); *F02B 41/10* (2013.01); *F01P 2003/185* (2013.01); *F01P 2025/42* (2013.01); *F01P 2060/02* (2013.01); *F02B 2053/005* (2013.01)

(58) Field of Classification Search
CPC ............ F02B 29/04–0443; F02B 37/00; F02B 37/001; F02B 37/004; F02B 37/007; F02B 37/013

USPC .............................. 60/598, 599, 605.1, 612; 123/184.21–184.61, 41.01, 559.1, 563
See application file for complete search history.

(56) References Cited

U.S. PATENT DOCUMENTS 4,291,535 A * 9/1981 Goloff ..................... F02B 37/00
123/315
7,281,378 B2 10/2007 Bickler et al.
(Continued)

FOREIGN PATENT DOCUMENTS

EP     2011962 A2    1/2009
EP     3112630 A1    1/2017
(Continued)

OTHER PUBLICATIONS

Translation of FR 2832185, published May 16, 2003.*

*Primary Examiner* — Mark A Laurenzi
*Assistant Examiner* — Mickey H France
(74) *Attorney, Agent, or Firm* — Norton Rose Fulbright Canada LLP

(57) ABSTRACT

A cooling system for an internal combustion engine comprises a fluid circuit having an intercooler, a main cooler and a precooler. The intercooler is configured for receiving coolant and configured for heat exchange relation between the coolant and engine compressed air. The main cooler is configured for receiving the coolant from the intercooler and the internal combustion engine and configured for selectively delivering a first portion of the coolant from the main cooler to the precooler. The precooler is configured to deliver a flow of the coolant to the intercooler. The main cooler and the precooler are configured for cooling the coolant by heat exchange with at least one cooling flow.

18 Claims, 2 Drawing Sheets

(56) References Cited

U.S. PATENT DOCUMENTS

| | | |
|---|---|---|
| 7,464,748 B2 | 12/2008 | Lee |
| 7,614,232 B2 | 11/2009 | Swenson et al. |
| 8,813,489 B2 | 8/2014 | Didelot et al. |
| 9,739,194 B2 | 8/2017 | Kuske et al. |
| 2008/0066697 A1 | 3/2008 | Raab et al. |
| 2011/0023796 A1 | 2/2011 | Cattani et al. |
| 2014/0299077 A1* | 10/2014 | Sowards .............. B60K 11/085 123/41.05 |

FOREIGN PATENT DOCUMENTS

| | | |
|---|---|---|
| EP | 3066313 B1 | 12/2017 |
| FR | 2832185 A1 | 5/2003 |
| WO | 2009078847 A1 | 6/2009 |

* cited by examiner

US 10,920,656 B2

INTERNAL COMBUSTION ENGINE COOLING SYSTEM

TECHNICAL FIELD

The application relates generally to cooling systems and, more particularly, to cooling systems for a liquid cooled internal combustion engine.

BACKGROUND OF THE ART

Liquid cooled internal combustion engines can reject a significant portion of the heat generated by the fuel to a coolant as intermediate fluid. In applications with increased power density requirements, the inlet pressure to the internal combustion engine is increased with a boost compressor. To satisfy adequate combustion of the fuel in the internal combustion engine and reduce the risk of auto-ignition of the fuel, either directly injected or premixed, an intercooler may be used to cool the air from the boost compressor before it enters the internal combustor engine. For an improved combustion of the fuel in the internal combustion engine, the inlet pressure is cooled by the coolant prior to entering the internal combustion engine.

In a known configuration, the intercooler may be part of a circuit performing two heat-exchange steps. In a first step, hot pressurized air rejects its heat to the coolant via an air-to-liquid heat exchanger. In a second step, the coolant is circulated to another liquid-to-air heat exchanger, to reject the heat to the outside air. In hot days, the coolant temperature may be too high to sufficiently reduce the temperature of pressurized air, i.e., in the case where the maximum acceptable pressurized air temperature which can enter the internal combustion engine is at a similar level as that of the temperature of the coolant.

SUMMARY

In one aspect, there is provided a cooling system for an internal combustion engine, the cooling system comprising a fluid circuit having an intercooler, a main cooler and a precooler, the intercooler configured for receiving coolant and configured for heat exchange relation between the coolant and engine compressed air, the main cooler configured for receiving the coolant from the intercooler and the internal combustion engine and configured for selectively delivering a first portion of the coolant from the main cooler to the precooler, the precooler configured to deliver a flow of the coolant to the intercooler, the main cooler and the precooler configured for cooling the coolant by heat exchange with at least one cooling flow.

In another aspect, there is provided a compound cycle engine comprising: an internal combustion engine; a compressor having compressed air delivered to the internal combustion engine; a cooling system comprising a fluid circuit having an intercooler, a main cooler and a precooler, the intercooler configured for receiving coolant and configured for heat exchange relation between the coolant and engine compressed air, the main cooler configured for receiving the coolant from the intercooler and the internal combustion engine and configured for selectively delivering a first portion of the coolant from the main cooler to the precooler, the precooler configured to deliver a flow of the coolant to the intercooler, the main cooler and the precooler configured for cooling the coolant by heat exchange with at least one cooling flow; and a duct receiving the main cooler and the precooler, the duct including a blower to circulate the at least one cooling flow in heat exchange relation with the coolant in the main cooler and the precooler.

In a further aspect, there is provided a method of circulating a coolant in a cooling system of a compound cycle engine, the method comprising: directing a coolant from an internal combustion engine of the compound cycle engine to a main cooler, for the coolant to release heat to at least one cooling flow; directing a first portion of the coolant from the main cooler to a precooler for the first portion of the coolant to release heat to the at least one cooling flow; selectively directing a second portion of the coolant from the main cooler to the internal combustion engine; directing the first portion of the coolant from the precooler to an intercooler of the compound cycle engine to cool engine compressed air by heat exchange relation; and directing the first portion of the coolant from the intercooler back to the main cooler.

DESCRIPTION OF THE DRAWINGS

Reference is now made to the accompanying figures in which.

DETAILED DESCRIPTION

Figure 1:
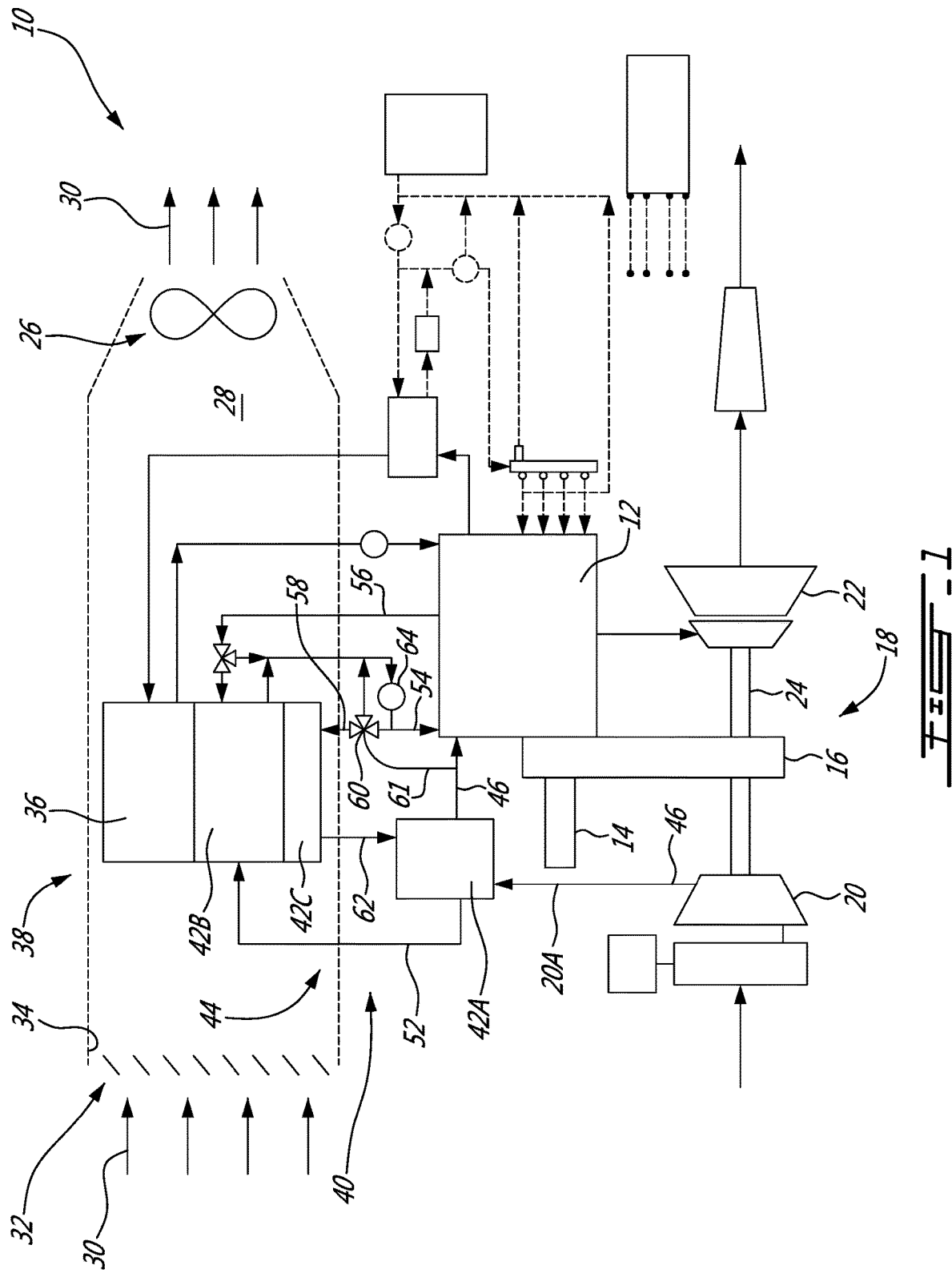
FIG. 1 is a block diagram of an internal combustion engine connected to a cooling system according to a particular embodiment.

Referring to FIG. 1, a compound cycle engine 10 is schematically shown. The compound cycle engine 10 can be used in applications such as aircraft engines (e.g., gas turbine engines) and Auxiliary Power Units (APU). The compound cycle engine 10 includes an internal combustion engine 12 having one or more rotary unit(s) to drive a common load. In the depicted embodiment, the common load includes an output shaft 14 which may be for example connected to a rotary unit such as a propeller or impeller of an aircraft through a reduction gearbox 16 and to which the rotary unit is engaged. The compound cycle engine 10 may also include a turbocharger 18 formed by a compressor 20 and a turbine 22 which are drivingly interconnected by a shaft 24. The compressor 20 of the turbocharger 18 compresses the air before the air enters the internal combustion engine 12 as pressurized or compressed air 20A. In a particular embodiment, the internal combustion engine 12 is a Wankel engine.

The compound cycle engine 10 may include a blower 26 to circulate a cooling flow along a path of a duct 28 of the compound cycle engine 10. The cooling flow can be cooling air or any other suitable cooling fluids, including liquid and/or gaseous coolants. In the embodiment shown, the cooling air circulating within the duct 28 flows along an airflow path 30. In a particular embodiment, the blower 26 circulates ambient air in the duct 28. A louver system 32 is mounted to an inlet 34 of the duct 28 to control an opening of the inlet 34 where the cooling air is drawn into the duct 28. In a particular embodiment, the louver system 32 partially closes the opening, for example, when the compound cycle engine 10 is operated in flight conditions and opens the opening when the aircraft is on the ground. In the depicted embodiment, an oil cooler 36 is mounted inside the duct 28 and is fluidly connected with the internal combustion engine 12. The oil cooler 36 receives oil from the internal combustion engine 12 and cools the oil when circulating the oil in heat exchange relation with the airflow path 30, in a liquid-to-air heat exchanger.

In a particular embodiment, the compound cycle engine 10 includes a cooling system 38 to cool the compressed air exiting or leaving the compressor 20 before the compressed air enters the internal combustion engine 12. The cooling system 38 maintains a temperature of the compressed air below a predetermined temperature to satisfy adequate combustion of fuel in the internal combustion engine 12 and to reduce the risk of an undesirable auto-ignition of the fuel. In a particular embodiment, the predetermined temperature is 250 degrees Fahrenheit. In the depicted embodiment, the cooling system 38 may also cool the internal combustion engine 12 by circulating coolant in the internal combustion engine 12. The internal combustion engine 12 rejects heat generated from the fuel combustion to the coolant of the cooling system 38. Thus, the internal combustion engine 12 can incorporate a "heat exchanger" for the purposes of its interaction with the cooling system 38. In a particular embodiment, the coolant includes a mixture of water and an anti-freeze substance. The anti-freeze substance can be any suitable substance such as propylene glycol.

In the depicted embodiment, the cooling system 38 has a fluid circuit 40 to circulate the coolant between heat exchangers 42A, 42B and 42C of the compound cycle engine 10. The fluid circuit 40 can be referred to as a "cooling circuit". The fluid circuit 40 fluidly connects the heat exchangers 42A, 42B and 42C with fluid transfer passageways 44 to provide fluid communication between the heat exchangers 42A, 42B, 42C. A "direct communication", or "direct fluid communication", between two heat exchangers indicates that a fluid transfer passageway of the fluid circuit 40 extends between the two heat exchangers without passing through another, e.g. third, heat exchanger. Heat exchanger 42A provides cooling to the compressed air and heat exchangers 42B and 42C provide cooling to the coolant circulating in the fluid circuit 40.

The cooling system 38 includes an intercooler 42A fluidly connected to the compressor 20 and to the internal combustion engine 12 through an air circuit 46, such that the compressed air exiting the compressor 20 passes through the intercooler 42A before entering the internal combustion engine 12. In the embodiment shown, the intercooler 42A is an air-to-liquid heat exchanger. The compressed air passes through the intercooler 42A through an air inlet and exits the intercooler through an air outlet. The intercooler 42A is also fluidly connected to the fluid circuit 40 to circulate the coolant within the intercooler 42A in heat exchange relation with the compressed air. In a particular embodiment, the coolant enters the intercooler 42A through a coolant inlet, circulate through the intercooler 42A and exits the intercooler 42A through a coolant outlet.

The cooling system 38 further include a main cooler 42B and a precooler 42C to cool the coolant circulating in the fluid circuit 40 to a desired temperature. In normal operation, the cooling system 38 maintains a temperature of the coolant entering the intercooler 42A at a lower temperature than the temperature of the compressed air, to cool the compressed air before it enters the internal combustion engine 12. In the embodiment shown, the main cooler 42B and precooler 42C are air-to-liquid heat exchangers. These two coolers 42B, 42C can be disposed within the duct 28 across the airflow path 30 to circulate the coolant therein in heat exchange relation with air of the airflow path 30 to cool the coolant. The speed of the blower 26 can be changed to vary the flow of the air within the airflow path 30 and consequently vary the amount of heat removed from the coolant, based on cooling requirements.

The main cooler 42B is in fluid communication with the intercooler 42A through the fluid circuit 40 to receive the coolant from the intercooler 42A. In the embodiment shown, the main cooler 42B is in direct communication with the intercooler 42A through fluid transfer passageway 52. The main cooler 42B is also in fluid communication with the internal combustion engine 12 to receive the coolant from the internal combustion engine 12 and to selectively deliver the coolant back to the internal combustion engine 12. In the depicted embodiment, the main cooler 42B is in direct communication with the internal combustion engine 12 through fluid transfer passageway 54 to supply the internal combustion engine 12 with the cooled coolant. The internal combustion engine 12 is also in direct communication with the main cooler 42B through fluid transfer passageway 56 to deliver the heated coolant to the main cooler 42B. The main cooler 42B has respective inlets and outlets to fluidly communicate with the internal combustion engine 12 through the fluid transfer passageways 54, 56.

The precooler 42C is in fluid communication with the main cooler 42B to selectively receive a portion of the coolant exiting the main cooler 42B. For example, in certain operating conditions, no coolant is delivered from the main cooler 42B to the precooler 42C. In a particular embodiment, a remainder of the coolant exiting the main cooler 42B is received by the internal combustion engine 12. In another embodiment, another portion of the coolant exiting the main cooler 42B is delivered to the internal combustion engine 12. The proportion of the coolant sent to the internal combustion engine 12 versus the coolant sent to the precooler 42C can be adjusted based on ambient conditions and power requirements of the compound cycle engine 10. The portion of the coolant exiting the main cooler 42B and entering the precooler 42C is further cooled in the precooler 42C, separately from the main cooler 42B. This portion of the coolant is thus cooled in a first step by the main cooler 42B and consecutively cooled in a second step by the precooler 42C. The precooler 42C is in direct communication with the main cooler 42B through fluid transfer passageway 58. The precooler 42C has respective inlets and outlets to fluidly communicate with the main cooler 42B through the fluid transfer passageway 58.

In the embodiment shown, the fluid transfer passageway 58 passes through a control valve 60 downstream of the main cooler 42B and upstream of the precooler 42C relative to a direction of the coolant exiting the main cooler 42B. The control valve 60 controls a flow of the portion of the coolant entering the precooler 42C.

In the embodiment shown, the control valve 60 is adapted to receive a signal 61 representative of the temperature of the compressed air exiting the intercooler 42A to determine a flow rate of coolant entering the precooler 42C. Any suitable temperature sensor can be used to measure the temperature of the compressed air exiting the intercooler 42A. On hot or warmer days, higher flow rates of coolant entering the precooler 42C may be required to adequately cool the compressed air entering the intercooler 42A. As such, all of the coolant exiting the main cooler 42B may be delivered to the precooler 42C.

Consequently, the precooler 42C is in fluid communication with the intercooler 42A to deliver the coolant from precooler 42C to the intercooler 42A. In the depicted embodiment, the precooler 42C is in direct communication with the intercooler 42A through fluid transfer passageway 62. This configuration can allow a flow of the coolant entering the intercooler 42A to be equal to the flow of the coolant entering the precooler 42C. Consequently, the flow of the coolant entering the intercooler 42A can be adjusted by adjusting the flow of the coolant entering the precooler 42C via the control valve 60. The precooler 42C has respective inlets and outlets to fluidly communicate with the intercooler 42A through the fluid transfer passageway 62.

The cooling system 38 includes a pump 64 in fluid communication with the fluid circuit 40 to pump the coolant at an increased pressure and to circulate the coolant along the fluid circuit 40. The pump 64 is located downstream of the main cooler 42B relative to the direction of the coolant exiting the main cooler 42B. In an alternate embodiment, the pump 64 is located at any other suitable location within the fluid circuit 40 or the internal combustion engine 12.

In a particular embodiment, for example on cooler days, a portion of the coolant exiting the main cooler 42B is directed to the intercooler 42A and a remainder of the coolant exiting the main cooler 42B is directed to the internal combustion engine 12. The cool ambient air may be sufficient to cool the coolant within the main cooler 42B to the desired temperature. On warmer days, the ambient air may be too warm to adequately and efficiently cool the coolant within the main cooler 42B to the desired temperature, thus a portion of the coolant exiting the main cooler 42B is directed to the precooler 42C so that the coolant is cooled twice before it enters the intercooler 42A to enable cooling the compressed air temperature coming out of the intercooler 42A to an acceptable level. This arrangement can be well suited for conditions of high temperature on the ground.

Figure 2:
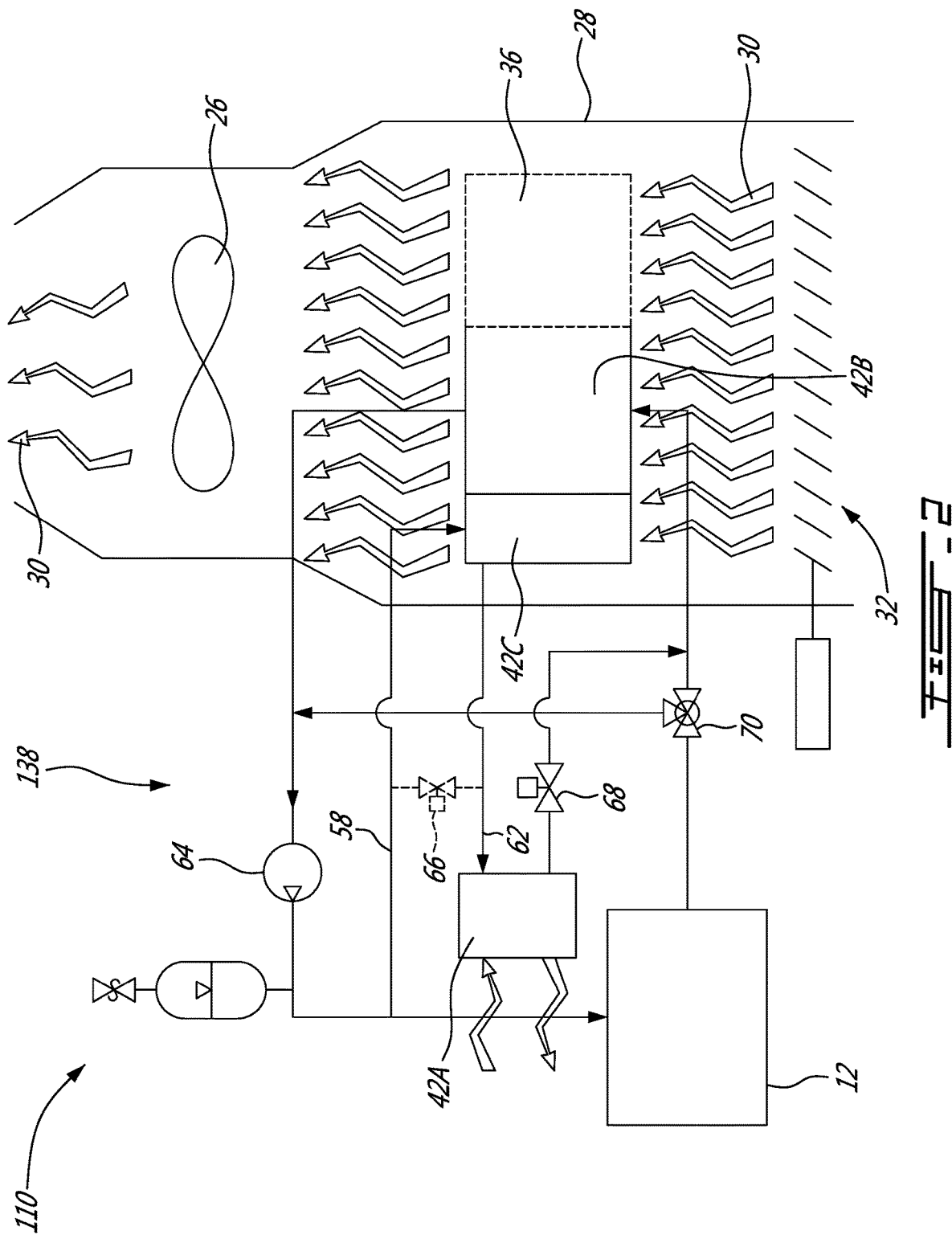
FIG. 2 is a block diagram of the cooling system of FIG. 1 according to another embodiment.

Referring to FIG. 2, the compound cycle engine 110 is schematically shown according to an alternate embodiment. Due to a similarity in components between the engine 10 of FIG. 1 and engine 110 of FIG. 2, like components will bear like reference numerals. The cooling system 138 may include a bypass valve 66 in fluid communication with the main cooler 42B and in fluid communication with the precooler 42C. The bypass valve 66 is located downstream of the main cooler 42B and located upstream of the precooler 42C relative to the direction of the coolant exiting the main cooler 42B. The bypass valve 66 directly interconnects the fluid transfer passageway 58 with the fluid transfer passageway 62 to selectively bypass the precooler 42C and to direct a selected portion of the coolant exiting the main cooler 42B directly to the intercooler 42A.

The cooling system 138 may also include a regulating valve 68 in fluid communication with and downstream of the intercooler 42A relative to a direction of the coolant exiting the intercooler 42A to regulate a flow of the coolant directly downstream of the intercooler 42A. The regulating valve 68 may be used to control the amount of coolant passing through the intercooler 42A versus the amount of coolant fed to the engine 12. The regulating valve 68 may cause a flow restriction to limit the amount of coolant passing through the intercooler 42A.

The cooling system 138 may also include a bypass valve 70 downstream of the intercooler 42A to selectively bypass the main cooler 42B and to deliver at least a portion of the coolant directly downstream of the main cooler 42B and/or to the internal combustion engine 12.

In a particular embodiment, the coolant is circulated in the cooling system 38, 138 by directing the coolant from the internal combustion engine 12 after absorbing heat therefrom to the main cooler 42B for the coolant to release heat to the air of the airflow path; directing a portion of the coolant exiting the main cooler 42B to the precooler 42C for the portion of the coolant to further release heat to the air of the airflow path, while directing the remainder of the coolant exiting the main cooler 42B to the internal combustion engine 12; directing the portion of the coolant from the precooler 42C to the intercooler 42A to cool the compressed air within the intercooler 42A upon circulating the coolant in heat exchange relation with the compressed air; and directing the coolant from the intercooler 42A to the main cooler 42B. In an alternate embodiment, another portion of the coolant exiting the main cooler 42B is directed to the intercooler 42A. In yet an alternate embodiment, another portion of the coolant exiting the main cooler 42B is directed to the internal combustion engine 12.

In a further alternate embodiment, a flow of each portion of the coolant exiting the main cooler 42B is determined based on the temperature of the compressed air exiting the intercooler 42A and optionally based on the ambient temperature.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A cooling system for an internal combustion engine, the cooling system comprising a fluid circuit having an intercooler, a main cooler and a precooler, the intercooler configured for receiving coolant and configured for heat exchange relation between the coolant and engine compressed air, the main cooler configured for receiving the coolant from the intercooler and the internal combustion engine and configured for selectively delivering a first portion of the coolant from the main cooler to the precooler, the precooler configured to deliver a flow of the coolant to the intercooler, the main cooler and the precooler configured for cooling the coolant by heat exchange with at least one cooling flow, wherein a flow of the coolant entering the precooler is equal to a flow of the coolant entering the intercooler.

2. The cooling system as defined in claim 1, comprising a pump in fluid communication with the fluid circuit downstream of the main cooler relative to a flow direction of the coolant delivered from the main cooler to the precooler to pump the coolant at an increased pressure.

3. The cooling system as defined in claim 1, wherein the at least one cooling flow is ambient air flow.

4. The cooling system as defined in claim 1, comprising a blower disposed within a duct to circulate the at least one cooling flow.

5. The cooling system as defined in claim 1, comprising a control valve disposed between the main cooler and the precooler in fluid communication with the fluid circuit, the control valve configured to control a flow of the first portion of the coolant entering the precooler.

6. The cooling system as defined in claim 5, wherein the control valve is configured to receive a signal representative of a temperature of the engine compressed air delivered to the internal combustion engine from the intercooler, the flow of the first portion of the coolant is determined in view of the temperature of the engine compressed air.

7. The cooling system as defined in claim 1, comprising a bypass valve in fluid communication with the fluid circuit downstream of the main cooler and upstream of the precooler and the intercooler relative to a flow direction of the first portion of the coolant to selectively bypass the precooler and to provide direct fluid communication from the main cooler to the intercooler.

8. The cooling system as defined in claim 1, comprising a regulating valve in fluid communication with the fluid circuit downstream of the intercooler relative to a flow direction of the coolant delivered from the intercooler to regulate a flow of the coolant downstream of the intercooler.

9. The cooling system as defined in claim 1, wherein the main cooler has a second portion of the coolant selectively delivered from the main cooler to the internal combustion engine.

10. The compound cycle engine as defined in claim 1, comprising an oil cooler disposed in the duct and in fluid communication with oil from the internal combustion engine, the oil cooler configured for heat exchange relation between the oil and the at least one cooling flow to cool the oil.

11. A compound cycle engine comprising:
an internal combustion engine;
a compressor having compressed air delivered to the internal combustion engine;
a cooling system comprising a fluid circuit having an intercooler, a main cooler and a precooler, the intercooler configured for receiving coolant and configured for heat exchange relation between the coolant and engine compressed air, the main cooler configured for receiving the coolant from the intercooler and the internal combustion engine and configured for selectively delivering a first portion of the coolant from the main cooler to the precooler, the precooler configured to deliver a flow of the coolant to the intercooler, the main cooler and the precooler configured for cooling the coolant by heat exchange with at least one cooling flow, wherein a flow of the coolant entering the precooler is equal to a flow of the coolant entering the intercooler; and
a duct receiving the main cooler and the precooler, the duct including a blower to circulate the at least one cooling flow in heat exchange relation with the coolant in the main cooler and the precooler.

12. The compound cycle engine as defined in claim 11, comprising a bypass valve in fluid communication with the fluid circuit downstream of the main cooler and upstream of the precooler and the intercooler relative to a flow direction of the first portion of the coolant to selectively bypass the precooler and to provide direct fluid communication from the main cooler to the intercooler.

13. The compound cycle engine as defined in claim 11, comprising a regulating valve in fluid communication with the fluid circuit downstream of the intercooler relative to a flow direction of the coolant delivered from the intercooler to regulate a flow of the coolant downstream of the intercooler.

14. The compound cycle engine as defined in claim 11, comprising a control valve disposed between the main cooler and the precooler in fluid communication with the fluid circuit, the control valve configured to control a flow of the first portion of the coolant entering the precooler and to control a flow of a second portion of the coolant delivered from the main cooler to the internal combustion engine.

15. The compound cycle engine as defined in claim 14, wherein the control valve is configured to receive a signal representative of a temperature of the compressed air delivered from the intercooler to the internal combustion engine, the flow of the first portion of the coolant is determined in view of the temperature.

16. A method of circulating a coolant in a cooling system of a compound cycle engine, the method comprising:
directing a coolant from an internal combustion engine of the compound cycle engine to a main cooler, for the coolant to release heat to at least one cooling flow;
directing a first portion of the coolant from the main cooler to a precooler for the first portion of the coolant to release heat to the at least one cooling flow;
selectively directing a second portion of the coolant from the main cooler to the internal combustion engine;
directing the first portion of the coolant from the precooler to an intercooler of the compound cycle engine to cool engine compressed air by heat exchange relation;
directing the first portion of the coolant from the intercooler back to the main cooler; and
selectively directing a third portion of the coolant from the main cooler to the intercooler.

17. The method as defined in claim 16, wherein the at least one cooling flow is an ambient air flow.

18. The method as defined in claim 16, comprising determining a flow of the first portion of the coolant from the main cooler based on a temperature of the engine compressed air delivered from the intercooler to the internal combustion engine.

* * * * *